United States Patent [19]

Croley et al.

[11] Patent Number: 4,862,164
[45] Date of Patent: Aug. 29, 1989

[54] INFRARED AIRCRAFT LANDING SYSTEM

[75] Inventors: Henry C. Croley; A. Wayne Antesberger, both of Fairfax County, Va.

[73] Assignee: The United States of America as represented by the Secretary of the Army, Washington, D.C.

[21] Appl. No.: 153,895

[22] Filed: Feb. 9, 1988

[51] Int. Cl.⁴ .......................... B64F 1/18; G08G 5/00
[52] U.S. Cl. ................................. 340/952; 244/114 R; 340/953; 340/956; 342/33
[58] Field of Search ................................. 340/947–950, 340/952, 953, 956, 90, 114 R, 84; 362/145, 62, 267; 244/114 R; 342/33, 53, 54

[56] References Cited

U.S. PATENT DOCUMENTS

| | | | |
|---|---|---|---|
| 2,549,860 | 4/1951 | Swanson | 340/952 |
| 2,975,284 | 3/1961 | Osborne | 340/952 |
| 3,519,984 | 7/1970 | Zychal | 340/953 |
| 3,537,310 | 11/1970 | Barrett | 340/949 |
| 3,784,968 | 1/1974 | Brosow | 340/956 |
| 4,196,346 | 4/1980 | McElhannon | 340/953 |
| 4,309,746 | 1/1982 | Rushworth | 340/953 |
| 4,385,354 | 5/1983 | Hornfeld et al. | 340/952 |
| 4,554,544 | 11/1985 | Task | 340/947 |
| 4,590,471 | 5/1986 | Pieroway et al. | 340/947 |
| 4,707,696 | 11/1987 | Task et al. | 340/947 |

Primary Examiner—Joseph A. Orsino
Assistant Examiner—Brent A. Swarthout
Attorney, Agent, or Firm—Max L. Harwell; John E. Holford; Anthony T. Lane

[57] ABSTRACT

A portable infrared landing site illumination system is provided for fixed wing and rotary wing aircraft having night vision capabilities as provided by the Army's second generation goggles (PVS-5) or the third generation goggles (ANVIS). The system employs special markers assembled from readily available disposable components and a simple above ground mounting stake. Also provided is a special laser illuminator which operates in several modes to assist all phases of the landing operation.

3 Claims, 5 Drawing Sheets

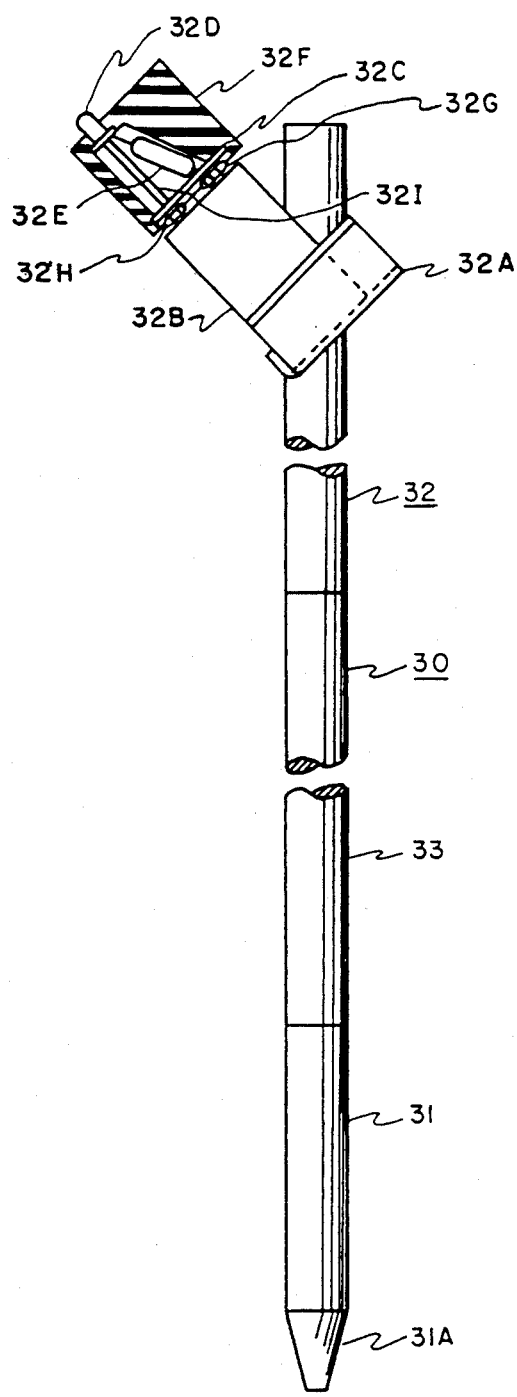
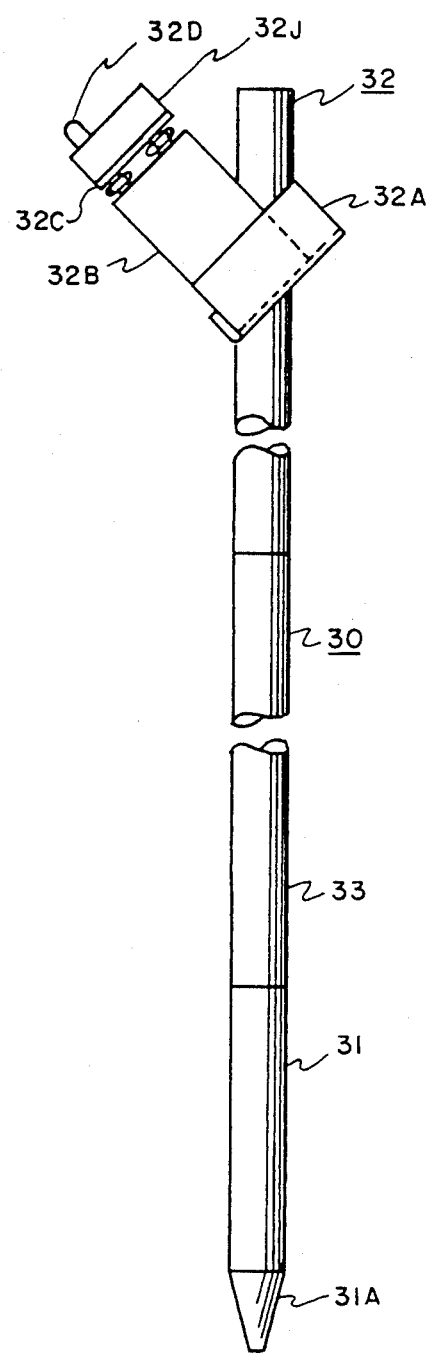
FIG. 3                    FIG. 3A

INFRARED AIRCRAFT LANDING SYSTEM

The invention described herein may be manufactured, used, and licensed by the U.S. Government for governmental purposes without the payment of any royalties thereon.

BACKGROUND

1. Field

The invention relates to illumination systems for aircraft runways and the like, particularly military runways operated on a temporary basis.

2. Prior Art

The usual method of lighting temporary military runways involved the use of bean bag lights arranged along the edge of the runway or landing pad. These cause excessive blooming in the night vision goggles and provide unwanted illumination that is easily detected by the unaided eye. Another approach is to use chemical light sticks that emit light when an inner capsule is ruptured. These are costly, however, and they are difficult to detect and recognize, particularly on the first approach by the aircraft. Pilots require a positive recognition signal at several miles to identify the landing site and a clearly defined set of light patterns at the landing site for proper orientation when landing. The light patterns should also match the capabilities of the aviator's current night vision goggles which is not true of systems currently in use.

SUMMARY OF THE INVENTION

Applicants have found that two readily available infrared (IR) sources provide a particularly good match to the sensitivity of night vision goggles. The first is a light emitting diode (LED) type XC880/XC880A presently stocked by local electronics dealers. Mounted a few feet above ground these provide excellent marker lights at close range to orient the pilot with the wind and runway. The second source is a 100 mW gallium aluminum-arsenide laser diode model SDL2410-H1. Optical elements are added to control the beam width and uniformity of the illumination. This laser can be mounted on a stake or tripod with controlled height, azimuth and elevation settings or held in one's hand. Electronic elements control the beam intensity and allow flashing and encoding. Familiar landing light patterns can be synthesized using only these two types of elements.

BRIEF DESCRIPTION OF DRAWINGS

The invention is best understood with reference to the attached drawings wherein:

FIG. 3 shows a preferred configuration for a marker light around the landing areas of FIGS. 1 and 2;

FIG. 3A shows an alternative detail of the battery-diode assembly 32B-32J in FIG. 3;

DESCRIPTION OF THE PREFERRED EMBODIMENT

Figure 1:
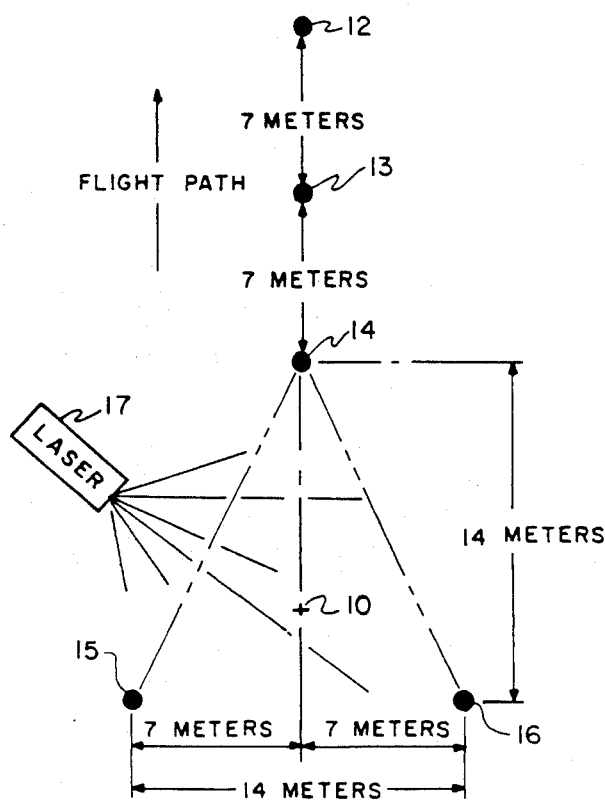
FIG. 1 shows a preferred landing-light pattern for a rotary wing (helicopter) aircraft landing pad.

As shown in FIG. 1, a touchdown point 10 for a rotary wing aircraft is delineated by an illuminated "Y" marker. The lighted marker 11 is placed so that the touchdown point is centered between the arms of the "Y". The stem of the "Y" points into the wind. To provide a depth cue the two or three marker lights 12, 14 and preferably 13 that outline the stem of the "Y" are spaced apart a distance of 7 meters. The two remaining lights 15 and 16 are spaced 14 meters apart on a line perpendicular to the stem and spaced 14 meters from the nearest end of the stem. An IR laser flood light 17 may flood the area around the touchdown point to aid in the final descent, the loading operations, or focussed in a narrow beam to act as a long distance beacon directed toward a remote aircraft.

Figure 2:
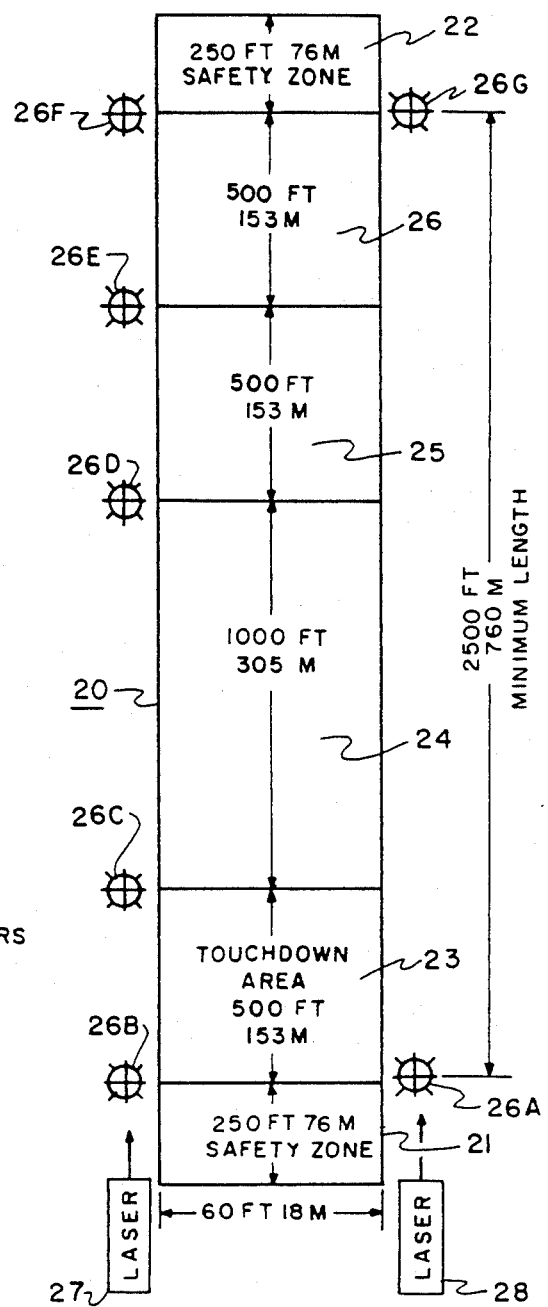
FIG. 2 shows a preferred landing-light pattern for a fixed wing aircraft landing strip (runway)

FIG. 2 shows an airstrip or runway 20 for a fixed wing aircraft. A standard width of 60 feet (18 meters) is maintained along the length of the runway. The length of the runway is a minimum of 2500 feet. Safety zones 21 and 22 which are 250 feet long are formed at each end of the runway. A touchdown area 23 which is 500 feet long is delineated by markers 26A-26C. A roll area 24 which is at least 1000 feet long is delineated by markers such as 26C and 26D every 500 feet. This is followed by a deceleration area 25 which is 500 feet long and delineated by markers such as 26D and 26E. This in turn is followed by a final warning area which is also 500 feet long and delineated by the three markers 26E-26G.

In the daytime the markers mentioned above may consist of panels with patterns of reflective and non-reflective material which identify the various areas. At night a light may be placed near or on the top of each panel. The present invention further proposes to place narrow beam laser light sources 27 and 28 near markers 26A and 26B directed along the edges of the runway. These illuminators indicate the direction of approach, the ground profile and contour, and can also illuminate the marker panels, if present.

FIG. 3 shows a preferred embodiment of a lighted night marker 30 according to the present invention. The first and lowermost element of the marker is a metal stake 31, such as a lower round tube section fitted with a hardened solid pointed member at one end. The opposite end is adapted to engage a reduced end portion of another round tube section of the same diameter and is sufficiently rugged to resist deformation when the pointed end of the stake is driven into hard soil. An uppermost tube section 32 is provided with a reduced end which mates with the non-pointed end of the stake and a metal receptacle 32A shaped to hold a standard commercially available snap terminal nine volt battery 32B. The receptacle slopes upwardly away from the post at about a 45° angle to space the snap terminals away from the post when a battery-diode assembly is inserted. The battery-diode assembly includes, in addition to the battery 32B, a two terminal mating end board connector 32C, a light emitting IR diode (LED) 32D, a series dropping resistor 32E (50 ohms), and a sponge rubber protective cap 32F. The LED and resistor are soldered in series between the connector terminals 32G and 32H, the anode lead of the diode being first fitted with a heat resistant dielectric sleeve 32I, and subsequently soldered to the anode terminal 32H of the connector. Additional center tube sections 33 can be added to provide various support heights. A suitable length for the stakes is 4 inches and the remaining sections 15 inches. The mating ends of the tube sections can be threaded to form a more stable structure, if desired.

FIG. 3A shows a detailed view of an alternate battery-diode assembly from FIG. 3. Besides the battery 32B, an end board connector 32C is provided which may in fact be the terminal end cut from the casing of an expired nine volt battery. The expired battery may be sawed in half and the insides removed. The LED 32D previously mentioned is then soldered in series with the same series voltage dropping resistor (50 ohm-2 watt) and the combination is soldered across the terminals on the end board inside the remaining half of the battery case, as before. The case is then filled with sufficient casting resin 32J to cover the resistor, all metal leads and to contact only non-radiating surface portions of the LED. The battery case is lastly cut to a level between the end board and the upper level of the solidified resin. The dielectric sleeve 32I of FIG. 3 may be used, but is not required, if this unit is carefully fabricated. The terminals of the end board are snapped onto the terminals of a fresh battery to form a marker head assembly and to turn the assembly on. The marker head (or battery-diode assembly) is inserted in the receptacle 32A as in FIG. 3 and the upper section 32 is rotated so that the LED faces the down-wind approach of the landing area.

Figure 4:
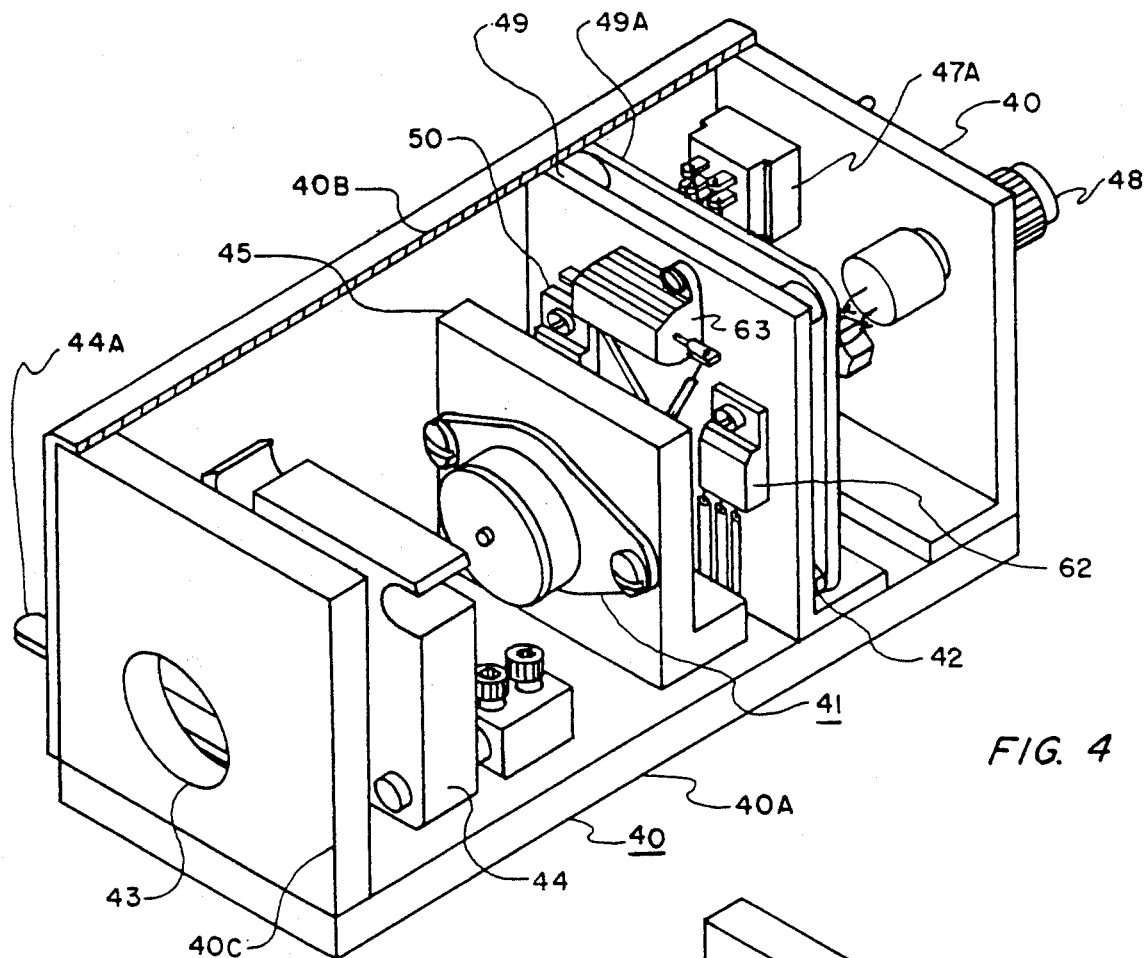
FIG. 4 shows a front view of a preferred laser illuminator for use around the landing area of FIGS. 1 and 2.

FIG. 4 shows a front view of a laser illuminator 40 which can be used for element 17 in FIG. 1 or elements 27 and 28 in FIG. 2. The illuminator uses a gallium-aluminum-arsenide laser diode, 41 type SDL-2410-H1, with a maximum continuous output of 100 milliwatts and a minimum output of 1 milliwatt at a wavelength of approximately 825 micrometers. The diode is mounted in a housing 42 and radiates through an opening 43 in one end of the housing. A moveable lens assembly 44 is mounted perpendicular to the optical axis of the laser diode between it and the opening 43. The lens is slideable, along two supports-like support 44A-parallel to the optical axis over a sufficient distance to focus the radiation from a very narrow beam a few degrees wide to a beam about 40 degrees wide. Lever 44B is attached at its inner end through a short flexible wire (not shown) to the lens-assembly. It is also pivotally mounted on the bottom of the case and has its outer end projecting through a slot in the case to permit external focussing. A diffuser 45 is mounted between the lens and laser diode to eliminate hot spots in the beam. This is particularly effective when the diffuser is an attenuating holograph generated by the beam for this purpose.

Figure 4A:
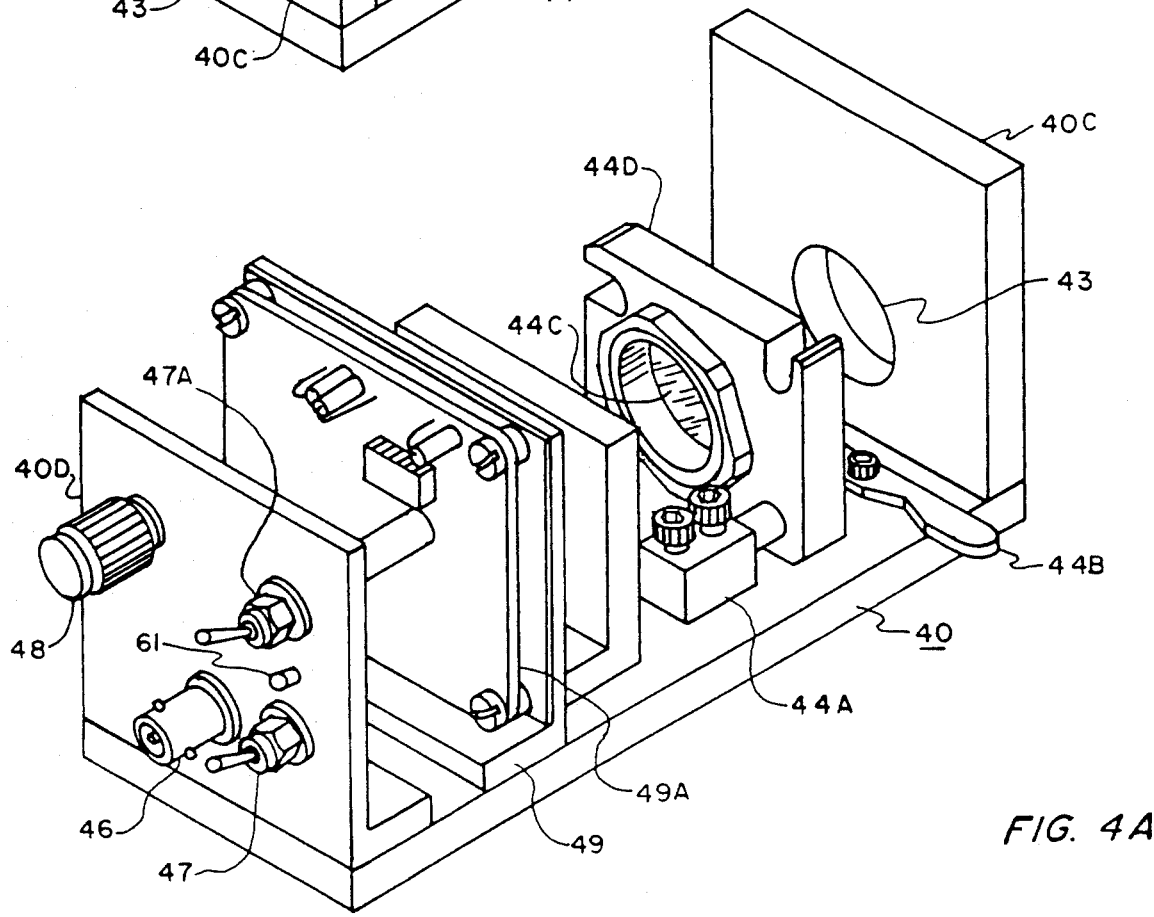
FIG. 4A shows a rear view of the laser illuminator in FIG. 4.

FIG. 4A shows a rear view of the laser illuminator. A male bayonet connector 46 is provided to receive a power cable from a standard 12 volt battery or other convenient power supply. An on-off switch 47A is provided and a separate switch 47 activates the flashing mode. A potentiometer 48 controls the intensity of beam. A component support bracket 49, carrying a circuit board 49A, mounted behind the laser also carries the supporting electronic components that control and protect the laser diode.

Figure 5:
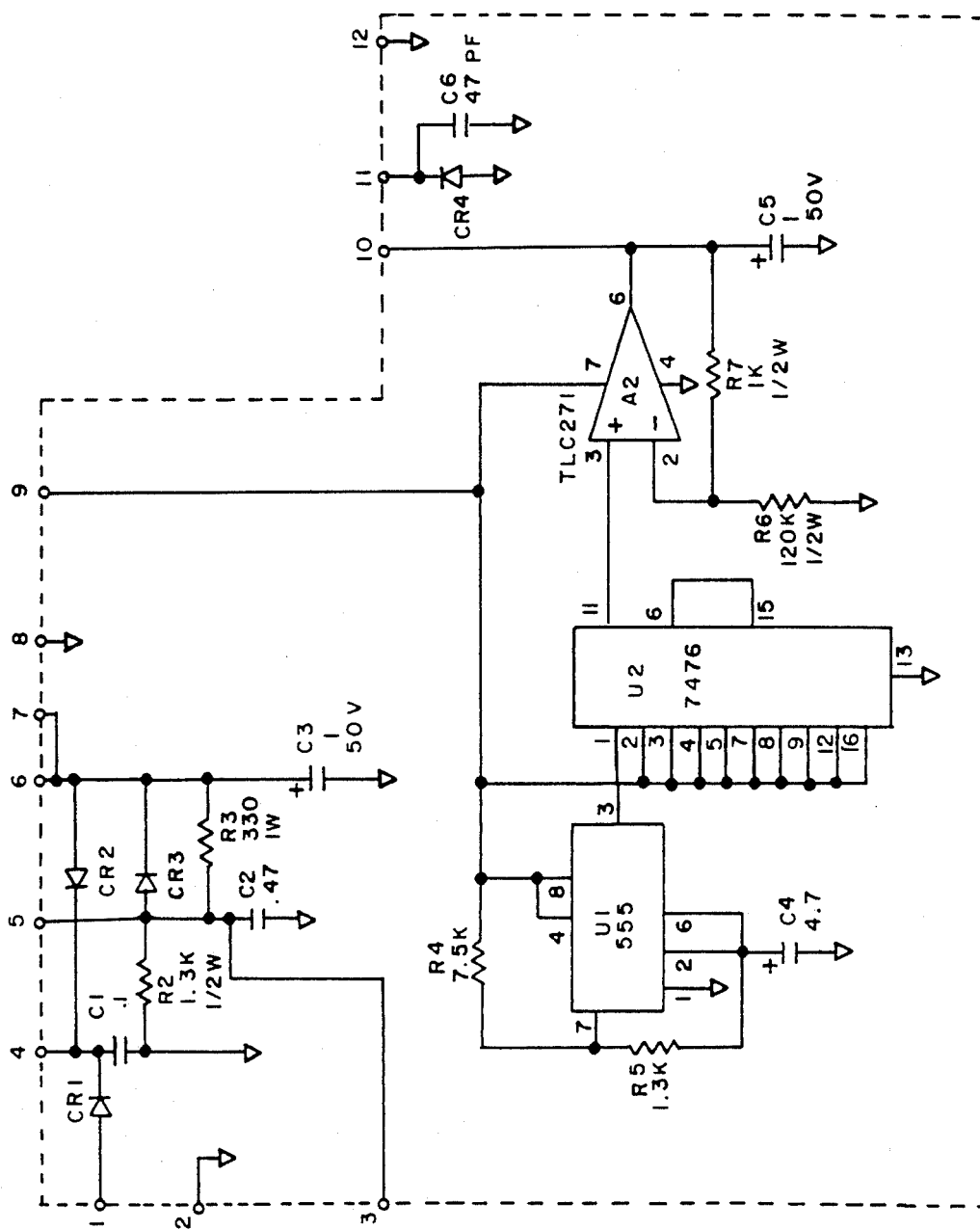
FIG. 5 shows a circuit diagram of a simple control board for the illuminator in FIG. 4.
Figure 6:
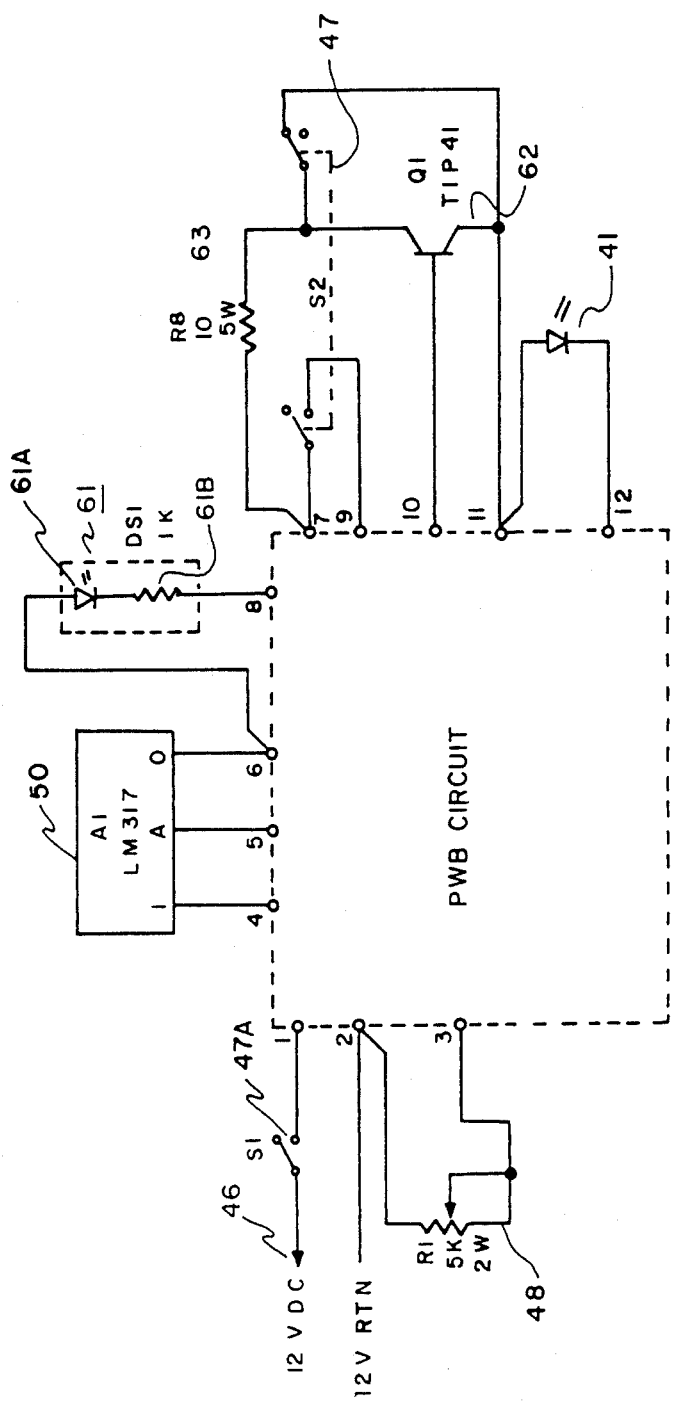
FIG. 6 shows the peripheral components connected to the board of FIG. 5.

FIG. 5 shows a detailed circuit diagram of the elements mounted on circuit board 49A. The board has external terminals along its edges (denoted by the dotted lines) and FIG. 6 shows the external elements connected to the external terminals. Diodes CR1, CR2 and CR3, resistors 48, R2 and R3, and capacitors C1, C2, and C3 provide a regulated power supply with a regulator A1 connected to external terminals 4, 5 and 6, and 12 volt dc source connected to external terminals 1 and 2; and variable resistor 48 (5K-2 W) connected to external terminals 2 and 3. The regulated output voltage appears at external terminals 7 and 8. External terminal 9 feeds this voltage to a pulse generating circuit comprising a timer U1, a frequency divider and pulse shaper U2 and an output operational amplifier A2. The numbers along the outer edges of these integrated elements denote the terminals according to standard practice in the art. R4, R5 and C4 are proportioned to provide timing cycles at a rate of 24 per second with the type 555 integrated circuit timer. The integrated type 7476 flip-flop circuit U2 divides this rate by 4 to provide a reliable and well defined square pulse at six cycles per second. This rate has been found to be very noticeable and even annoying to a human observer. As will be appreciated by those skilled in the electronic art, other circuits are readily available that supply encoded pulses of various frequencies and duration for recognition purposes. These relatively weak pulses are passed to an operational amplifier A2 type TLC 271. Resistors R6 and R7 together with capacitor C5 provide the required gain for the operational amplifier to drive an external switching transistor Q1 connected between external terminals 7 and 11 and controlled through external terminal 10. Diode CR4 and capacitor C6 maintain the proper switching bias at the external anode terminal 11 and protect against voltage spikes for the laser diode 11 which is connected between external terminals 11 and 12. Switch 47A connects the positive terminal of the battery to external terminal 1. Switch 47, which is a double pole single throw switch, bypasses the switching transistor and disconnects the voltage to the pulse generator for continuous illumination or code flashing manually with switch 47.

In FIGS. 5 and 6 capacitances are given in microfarads and resistances in ohms. The diodes are type 1N4001 and the open triangles indicate common returns. Element 61A connected to external terminals 6 and 8 is an optional pilot light comprising any suitable LED 61A and dropping resistor 61B. As previously indicated the laser illuminator serves a number of functions in the landing and unloading of aircraft. Initially the illuminator can serve as a beacon in a narrow beam mode to make contact with the aircraft. Contact can be confirmed or acknowledged by radio. As the aircraft approaches the beam can be widened to prevent blooming of the direction devices in the aircraft. At close approaches the beam can be redirected along the edge of the landing area again in its narrow mode. During the final approach the beam can again be widened to illuminate the landing surface nearest touchdown. After landing the illuminator can be focussed in the areas of interest in cargo removal, aircraft maintenance and the like.

For military purposes the foregoing elements are best supplied in the form of kits. The marker light kit may contain 6 diodes with snap terminals, 5 stakes, 5 center tube sections, 5 uppermost tube sections with battery holders and 5 standard nine volt batteries. The laser illuminator kit contains the laser illuminator with a male bayonet terminal (46 in FIG. 4A) and a threaded hole in bottom of its housing (42 in FIG. 4A) to engage the head of a tripod, a tripod with a head adjustable in azimuth and elevation, a 12 volt battery pack with a female bayonet output terminal and an extension cord with couplings at opposed ends to mate with the battery and illuminator bayonet terminals. Other kits can be formed using two or more of any of the above kits. Each kit will have a suitable container to hold the kit items. The container may vary according to kit usage from a simple cloth bag to a cushioned hard shell container that can withstand a substantial airdrop.

We claim:

1. A lighting kit for a temporary aircraft landing site including a plurality of covert markers each consisting of:
    a rodlike support adapted at one end to be driven into the ground with an integral battery receptacle at the opposite end thereof;
    a battery with snap fastener terminals loosely mounted in said receptacle;
    an infrared light emitting diode electrically and mechanically fastened to said battery terminals by means of a single pair of snap fasteners; and
    at least four of said markers being arranged in the form of a "Y" located adjacent said landing site with the stem of said "Y" pointing toward the center of said site and in the direction from which the wind is blowing.

2. The kit according to clam 1 wherein;
    one of said markers is located at one edge of a runway;
    a second of said markers located at an opposite edge of said runway;
    a first infrared laser illuminator having a first narrow beam;
    a first mounting means supporting a first laser illuminator above the ground, within a few hundred feet from said marker, such that said one marker is located adjacent one edge of said first beam; and
    a second mounting means and laser illuminator providing a second beam similar to said first illuminator located so that said second marker is on one edge of said second beam, the remaining edges of said first and second beams lying between the markers and the center of said runway.

3. A method of covertly illuminating a landing site for aircraft equipped with night vision equipment maximally sensitive to specific bands of IR radiation; comprising the steps of:
    A. directing an intense variable beam width primary source of said IR radiation in its most narrow beam configuration directly toward said aircraft until the aircraft reaches the range at which blooming can occur in said night vision equipment;
    B. modulating said source in accordance with a preselected code until said aircraft acknowledges contact with said landing site;
    C. gradually increasing the beam width as the aircraft approaches until the aircraft is within landing range;
    D. directly illuminating a spot near the edge of said site with said primary intense source of IR radiation;
    E. lighting small points near the edge of said site with much less intense secondary sources of said IR radiation; and
    F. diffusing the radiation from said primary source to provide a substantially uniform illumination intensity over at least a substantial fraction of the downwind area on said landing site, said uniform intensity being less than the intensity of said secondary sources.

* * * * *